US006814246B2

(12) United States Patent
Payne et al.

(10) Patent No.: US 6,814,246 B2
(45) Date of Patent: Nov. 9, 2004

(54) COLLISION ATTENUATING SYSTEM

(76) Inventors: Thomas S. Payne, 32205 Allison Dr., Union City, CA (US) 94587; James M. Payne, 3721 Knox Ave., Rosamond, CA (US) 93560

( * ) Notice: Subject to any disclaimer, the term of this patent is extended or adjusted under 35 U.S.C. 154(b) by 0 days.

(21) Appl. No.: 10/459,238

(22) Filed: Jun. 10, 2003

(65) Prior Publication Data

US 2004/0011756 A1 Jan. 22, 2004

Related U.S. Application Data

(63) Continuation-in-part of application No. 10/261,923, filed on Oct. 1, 2002, now Pat. No. 6,619,491, which is a division of application No. 09/753,540, filed on Jan. 2, 2001, now Pat. No. 6,474,489, which is a continuation-in-part of application No. 09/267,028, filed on Mar. 12, 1999, now abandoned.

(51) Int. Cl.[7] ............................................. B61G 11/00
(52) U.S. Cl. .................... 213/221; 213/223; 105/392.5; 105/394
(58) Field of Search .............................. 213/220, 221, 213/222, 223; 105/394, 392.5, 393; 293/102, 120, 133, 107

(56) References Cited

U.S. PATENT DOCUMENTS

| | | |
|---|---|---|
| 520,573 A | 5/1894 | Richards |
| 533,418 A | 1/1895 | Richards |
| 616,395 A | 12/1898 | Bedford |
| 625,603 A | 5/1899 | Prophitt |
| 626,480 A | 6/1899 | Bemelmans |
| 761,421 A | 5/1904 | Snyder |
| 854,290 A | 5/1907 | Hale |
| 2,090,988 A | 8/1937 | Snyder |
| 3,677,595 A | 7/1972 | Hamilton |
| 3,843,181 A | 10/1974 | Dera et al. |
| 3,934,912 A | 1/1976 | Ogihara et al. |
| 4,715,292 A | 12/1987 | Pavlick et al. |
| 5,052,732 A * | 10/1991 | Oplet et al. .................. 293/102 |
| 5,101,927 A | 4/1992 | Murtuza |
| 5,199,755 A * | 4/1993 | Gertz .......................... 293/120 |
| 5,213,383 A | 5/1993 | Muselli et al. |
| 5,619,931 A | 4/1997 | Madison |
| 5,697,657 A | 12/1997 | Unrath, Sr. |
| 5,725,265 A | 3/1998 | Baber |

(List continued on next page.)

FOREIGN PATENT DOCUMENTS

| | | | |
|---|---|---|---|
| DE | 10062560 | * | 7/2001 |
| DE | 10213178 | * | 2/2003 |
| JP | 8-276816 | * | 10/1996 |
| JP | 8-276817 | * | 10/1996 |
| WO | WO 97/18108 | * | 5/1997 |

*Primary Examiner*—Mark T. Le
(74) *Attorney, Agent, or Firm*—Dorsey & Whitney LLP

(57) ABSTRACT

A collision attenuating system for a moving vehicle including an energy-absorbing airbag assembly dimensioned and configured for attenuating the impact between the moving vehicle and a pedestrian or an impacted vehicle located in or crossing the path of the moving vehicle as the pedestrian or impacted vehicle impacts against the airbag assembly, a mounting bracket dimensioned and configured for being affixed to the moving vehicle, an engagement bracket affixed to the airbag assembly and engagable with the mounting bracket, and a quick-release fastener for removably engaging the engagement bracket to the mounting bracket for removably mounting the airbag assembly to the moving vehicle. The airbag assembly includes an airbag and an assembly frame supporting the airbag, a speed sensor for determining the speed of the vehicle, and a pressure regulator for controlling a pressure function of the airbag responsive to the speed sensor. The airbag assembly includes an upper deflatable airbag, and a lower pedestrian support, the pedestrian support including energy-absorbing structure. A method of using the collision attenuating system is also described.

29 Claims, 7 Drawing Sheets

U.S. PATENT DOCUMENTS

| | | |
|---|---|---|
| 5,785,368 A | 7/1998 | Hartmann et al. |
| 5,810,427 A | 9/1998 | Hartmann et al. |
| 6,039,349 A | 3/2000 | Laporte et al. |
| 6,056,336 A | 5/2000 | Balgobin |
| 6,106,038 A * | 8/2000 | Dreher ........................ 293/118 |
| 6,293,205 B1 * | 9/2001 | Butler ...................... 105/392.5 |

* cited by examiner

COLLISION ATTENUATING SYSTEM

CROSS-REFERENCES TO RELATED APPLICATIONS

This application is a Continuation-in-Part of U.S. patent application Ser. No. 10/261,923, filed Oct. 1, 2002, entitled COLLISION ATTENUATOR ASSEMBLY and now U.S. Pat. No. 6,619,491, which is a Divisional of U.S. patent application Ser. No. 09/753,540 filed Jan. 2, 2001, entitled COLLISION ATTENUATOR ASSEMBLY and now U.S. Pat. No. 6,474,489, which is a Continuation-in-Part of U.S. Pat. No. 09/267,028, filed Mar. 12, 1999, entitled COLLISION ATTENUATOR ASSEMBLY and now abandoned, the entire contents of which applications is incorporated herein by this reference.

BACKGROUND OF THE INVENTION

1. Field of the Invention

The present invention relates, in general, to collision attenuating systems and, more particularly, to improved collision attenuating systems for the front ends of railroad trains and other relatively large moving vehicles, and to methods for their use.

2. Description of Related Art

Railroad trains are heavy vehicles that are difficult to stop in emergency situations. Furthermore, railroad trains cannot be steered to avoid pedestrians and other motor vehicles that inadvertently cross the path of a moving railroad train. Railroad trains are extremely heavy relative to pedestrians as well as most motor vehicles including automobiles, sport-utility vehicles, trucks, vans, and buses. The front of a locomotive or a railroad car is typically constructed of a large rigid steel structure that yields minimally, if at all, in the event of a collision with a pedestrian or a motor vehicle. Unfortunately, due to these factors, collisions between railroad trains and pedestrians or between railroad trains and motor vehicles result all too often in fatalities for the pedestrians or for the occupants of the impacted motor vehicles.

Current efforts to reduce such fatalities have focused on collision prevention. Collision prevention techniques include warning devices on the railroad train such as horns and lights, warnings and barriers at railway and pedestrian crossings and as well as railway and motor vehicle crossings. Also, fencing is used along railroad right of ways to restrict access by pedestrians and/or motor vehicles. Unfortunately, pedestrians and motor vehicle operators on occasion accidentally miss, ignore, or deliberately circumvent these warning systems.

One known system for reducing the severity of impact between a train and a land vehicle is disclosed U.S. Pat. No. 6,293,205 to Butler. The Butler patent discloses a train collision system in the form of a flatbed car coupled to the front of a train. Disadvantageously, such systems are large and relatively expensive in that an additional railcar is required. Such systems are difficult to store and would occupy space that could be used by other working railcars and locomotives. Such systems may also be very expensive to maintain, replace or recondition, possibly approaching or exceeding the cost of a railcar. Furthermore, such systems are simply ineffective for collisions involving pedestrians.

What is needed is an improved collision attenuating system that overcomes the above and other disadvantages of known collision attenuating devices and collision prevention techniques.

Additionally, when a relatively large moving vehicle, such as a sport-utility vehicle, truck, or bus, impacts a pedestrian or a smaller vehicle, the difference in mass of the two results in an inordinate amount of damage and injury to the pedestrian or occupants of the smaller impacted vehicle.

What is also needed is an improved collision attenuating system that can be utilized on larger moving vehicles while overcoming the above and other disadvantages of known collision attenuating devices and collision prevention techniques.

BRIEF SUMMARY OF THE INVENTION

In summary, one aspect of the present invention is directed to a collision attenuating system for a moving vehicle including an energy-absorbing airbag assembly dimensioned and configured for attenuating the impact between the moving vehicle and a pedestrian or an impacted vehicle located in or crossing the path of the moving vehicle as the pedestrian or impacted vehicle impacts against the airbag assembly, a mounting bracket dimensioned and configured for being affixed to the moving vehicle, an engagement bracket affixed to the airbag assembly and engagable with the mounting bracket, and a quick-release fastener for removably engaging the engagement bracket to the mounting bracket for removably mounting the airbag assembly to the moving vehicle. In one embodiment, the collision attenuating system is mounted to a leading end of a leading railcar supported on a railway.

The airbag assembly may include an airbag and an assembly frame supporting the airbag, the engagement bracket being affixed to the assembly frame. The collision attenuating system may include a plurality of mounting brackets, a plurality of engagement brackets affixed to the assembly frame, and a plurality of quick-release fasteners for releasably engaging respective ones of the mounting and engagement brackets. The collision attenuating system may include a retractable wheel assembly mounted on the assembly frame for selectively raising the airbag assembly. The collision attenuating system may include a lifting mechanism mounting the retractable wheel assembly to the assembly frame. The collision attenuating system may include an energy-absorbing crush structure interconnecting the assembly frame and the engagement bracket. The collision attenuating system may include a shock absorber interconnecting the assembly frame and the engagement bracket.

In one embodiment, the collision attenuating system includes a speed sensor for determining the speed of the vehicle and a pressure regulator for controlling a pressure function of the airbag responsive to the speed sensor. The pressure regulator is an air pressure release valve.

Another aspect of the present invention is directed to a collision attenuating system for a moving vehicle including an energy-absorbing airbag assembly dimensioned and configured for attenuating the impact between the moving vehicle and a pedestrian or an impacted vehicle located in or crossing the path of the moving vehicle as the pedestrian or impacted vehicle impacts against the airbag assembly, the airbag assembly including an airbag and an assembly frame supporting the airbag, a speed sensor for determining the speed of the vehicle, and a pressure regulator for controlling a pressure function of the airbag responsive to the speed sensor. In one embodiment, the pressure regulator may include an air pressure release valve. Alternatively, the air pressure regulator may include a variable speed inflation fan. The attenuating system may include a mounting bracket dimensioned and configured for being affixed to the moving vehicle, an engagement bracket affixed to the airbag assembly and engagable with the mounting bracket, and a quick-release fastener for removably engaging the engagement bracket to the mounting bracket for removably mounting the airbag assembly to the moving vehicle.

Yet another aspect of the present invention is directed to a collision attenuating system including an energy-absorbing assembly dimensioned and configured for attenuating the impact between the moving vehicle and a pedestrian or an impacted vehicle located in or crossing the path of the moving vehicle as the pedestrian or impacted vehicle impacts against the energy-absorbing assembly, and an assembly frame for securing the energy-absorbing assembly to the moving vehicle, wherein the airbag assembly may include an upper deflatable airbag, and a lower pedestrian support, the pedestrian support including energy-absorbing structure. The upper deflatable airbag may include at least one internal baffle. The pedestrian support may include a hydraulic shock absorber and/or a pneumatic shock absorber. The pedestrian support may include an energy-absorbing crush structure. The collision attenuating system may include a skid plate located below the pedestrian support. In one embodiment, the energy-absorbing structure is constructed of foam, an air bladder, or a combination thereof.

In one embodiment, the pedestrian support is flexibly supported by the assembly frame such that a leading edge of the pedestrian support moves upward upon at least partial deflation of the upper deflatable airbag due to impact with the pedestrian or impacted vehicle. The collision attenuating system may include a hinge flexibly supporting the pedestrian support on the assembly frame. The collision attenuating system may include a locking retractor configured to prevent downward motion of the leading edge of the pedestrian support. The collision attenuating system may include a speed sensor for determining the speed of the vehicle, and a pressure regulator for controlling a pressure function of the airbag responsive to the speed sensor. In one embodiment, the pressure regulator is an air pressure release valve. The collision attenuating system may include a retractor interlock, wherein the retractor interlock locks the locking retractor once the release valve releases air from the upper deflatable airbag. The collision attenuating system may include a release mechanism for lowering the pedestrian support after the locking retractor is locked. The collision attenuating system may include, a mounting bracket dimensioned and configured for being affixed to the moving vehicle, an engagement bracket affixed to the airbag assembly and engagable with the mounting bracket, and a quick-release fastener for removably engaging the engagement bracket to the mounting bracket for removably mounting the airbag assembly to the moving vehicle.

An object of the present invention is to provide an improved collision attenuating system to better reduce the severity of an impact, which cannot be otherwise prevented, between a moving train or other relatively large vehicle and either a pedestrian or another relatively small vehicle.

Another object of the present invention is to provide a collision attenuating system configured to capture an impacted pedestrian.

The collision attenuating system of the present invention has other features and advantages that will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
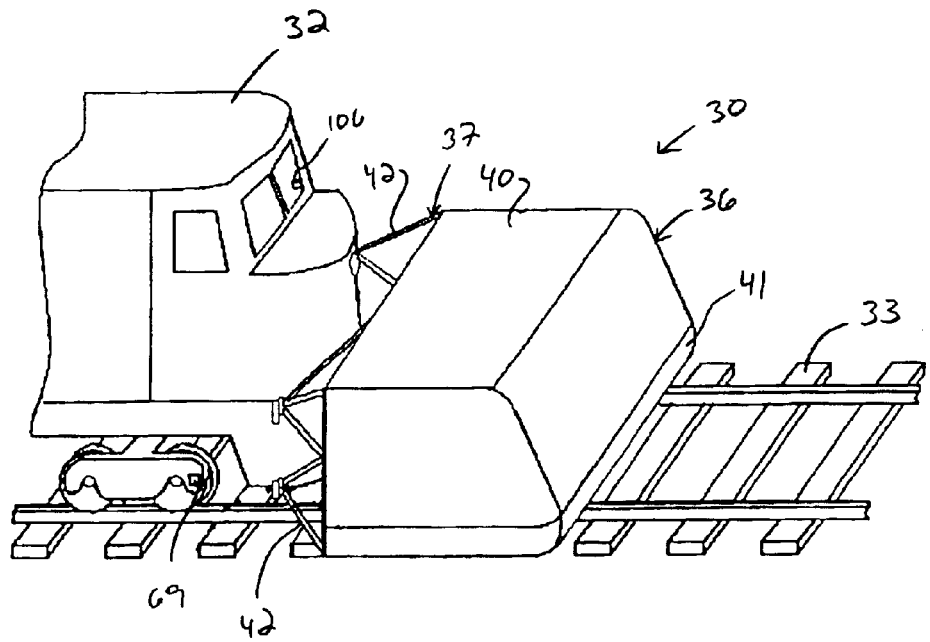
FIG. 1 is a perspective view of a collision attenuating system having an energy-absorbing unit and an assembly frame in accordance with the present invention, the collision attenuating system being shown mounted on a locomotive.

Turning now to the drawings, wherein like components are designated by like reference numerals throughout the various figures, attention is directed to FIG. 1, which shows a collision attenuating system, generally designated by the numeral 30, mounted on the front end of a locomotive 32, which locomotive is equipped with a coupler and is configured for motion along a railway 33. It will be understood that the collision attenuating system can also be configured for mounting on other types of railcars including, but not limited to, flatbeds, boxcars, and light rail vehicles. Alternatively, the collision attenuating system of the present invention may be configured for mounting on the front of relatively large and fast moving vehicles including, but not limited to, trucks, buses, automobiles, and/or sport-utility vehicles.

Collision attenuating system 30 generally includes an energy-absorbing airbag assembly 36 and an assembly frame 37 for supporting the airbag assembly and mounting it to the front end of locomotive 32. In this respect, collision attenuating system 30 is similar in some aspects to the attenuators disclosed by U.S. Pat. No. 6,474,489, the entire content of which patent is incorporated herein by this reference. Collision attenuating system 30 of the present invention includes a variety of additional features including, but not limited to, a quick-release mounting system, a speed dependent pressure regulator, and an energy-absorbing pedestrian support, which features are discussed in greater detail below.

With continued reference to FIG. 1, energy-absorbing airbag assembly 36 includes an upper deflatable airbag 40 and a lower pedestrian support 41, both of which are supported by assembly frame 37. The assembly frame includes sixteen extension members 42 which position collision attenuating system 30 such that airbag assembly 36 is located in front of locomotive 32 a sufficient distance to clear the front coupler of locomotive 32.

Figure 2:
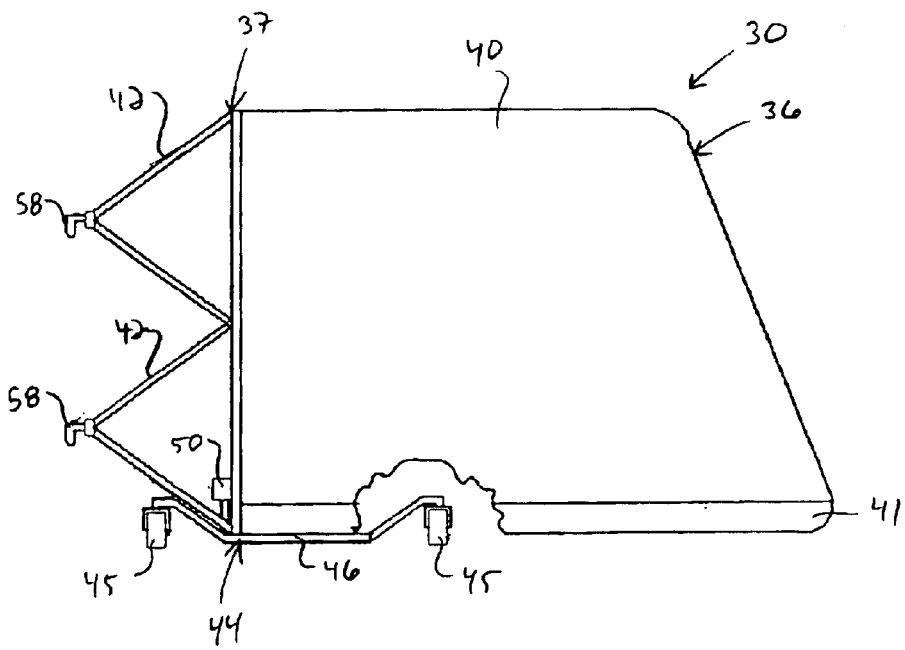
FIG. 2 is a side elevational view of the collision attenuating system of FIG. 1, the collision attenuating system shown removed from the locomotive.
Figure 3:
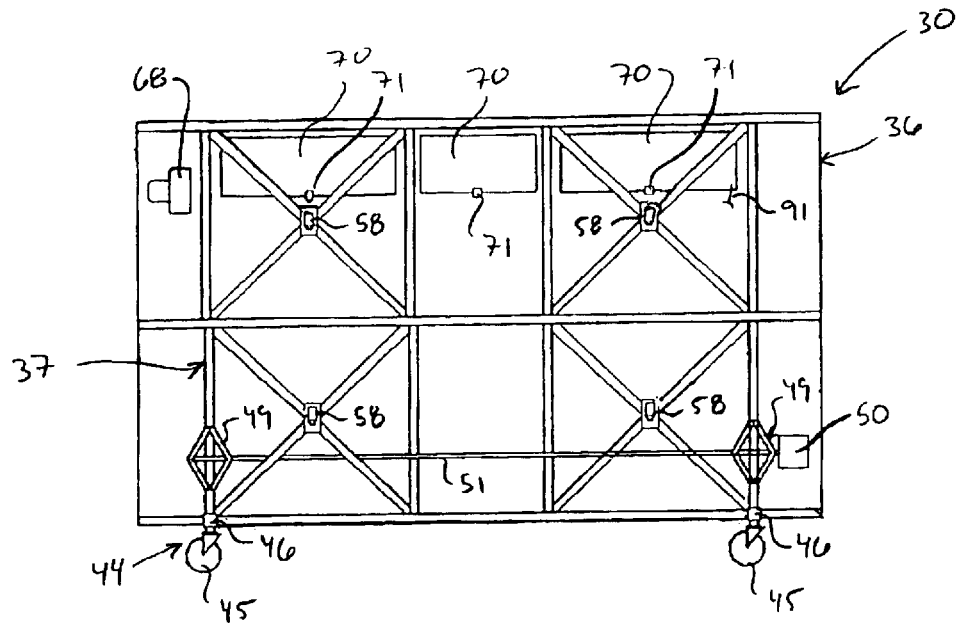
FIG. 3 is a rear elevational view of the collision attenuating system of FIG. 1.

As shown in FIG. 2 and FIG. 3, assembly frame 37 is provided with a retractable wheel assembly 44 that may be used to install and/or uninstall collision attenuating system 30 on or from the front of locomotive 32. Retractable wheel assembly 44 includes four wheels 45 mounted on a pair of wheel support frames 46. In the illustrated embodiment, four caster wheels are mounted on two wheel support frames 46 in order to provide a stable, wheeled support for collision attenuating system 30 that may be wheeled in any direction. One should appreciate, however, that a number of different configurations may be used in accordance with the present invention. For example, one, two, three or more wheels can be utilized and may be mounted on one, two, three or more wheel frames.

Each wheel support frame 46 is retractably supported on a lower portion of assembly frame 37 by a lifting mechanism 49. In the embodiment of FIG. 3, the lifting mechanism is in the form of a scissor jack. In one embodiment, scissor jacks 49 are activated by a lifting motor 50 that is operably coupled to the scissor jacks by a lifting screw 51. Lifting motor 50 is actuated to spin lifting screw 51 either clockwise or counterclockwise in order to actuate scissor jacks 49 thus raising or lowering wheels 45 relative to assembly frame 37.

The configuration of retractable wheel assembly 44 allows collision attenuating system 30 to be wheeled in front of locomotive 32 such that the collision attenuating system can be raised, aligned, and mounted on the front end of the locomotive. Once collision attenuating system 30 is engaged to the front of locomotive 32, the lifting mechanism can again be activated in order to raise retractable wheel assembly 44 with respect to assembly frame 37 thus providing clearance between collision attenuating system 30 and railway 33.

Figure 4:
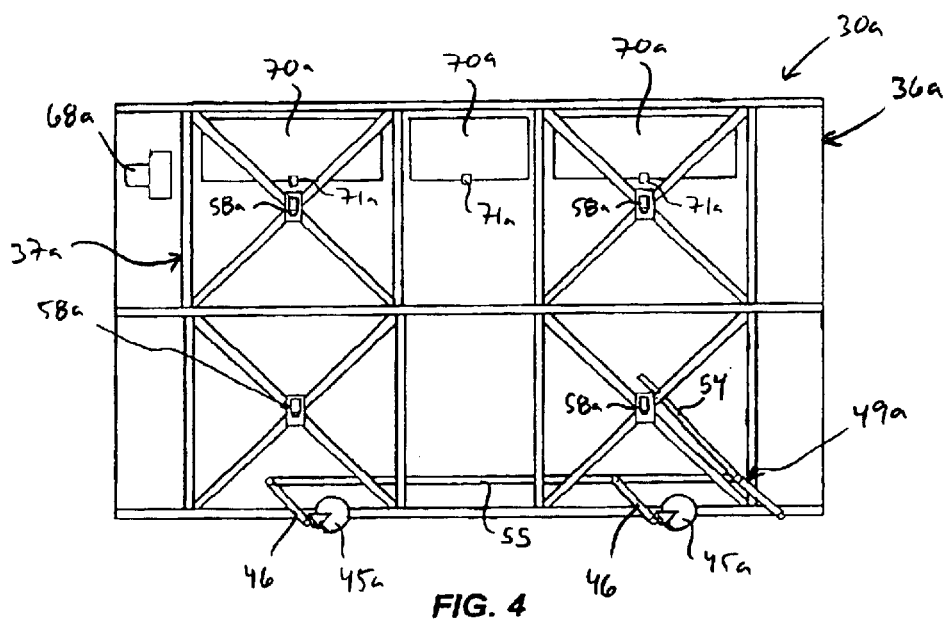
FIG. 4 is a rear elevational view of a modified collision attenuating system assembly similar to that of FIG. 1.

One should appreciate that the configuration of the retractable wheel assembly and the lifting mechanism may vary in accordance with the present invention and can include hydraulic, pneumatic, mechanical and/or electrical lifting means. For example, FIG. 4 shows an alternative lifting mechanism 49a on the base of assembly frame 37a. In this embodiment, lifting mechanism 49a is in the form of a lever 54 and lifting linkage assembly 56 that pivots wheel support frames 46a such that wheels 45a are raised and lowered with respect to assembly frame 37a. A shown in FIG. 4, when lever 54 is in its leftmost position, wheels 35a are rotated upward in a retracted position. This is the normal operating position of wheels 35a when collision attenuating system 30 is attached to the front of locomotive 32.

Figure 5:
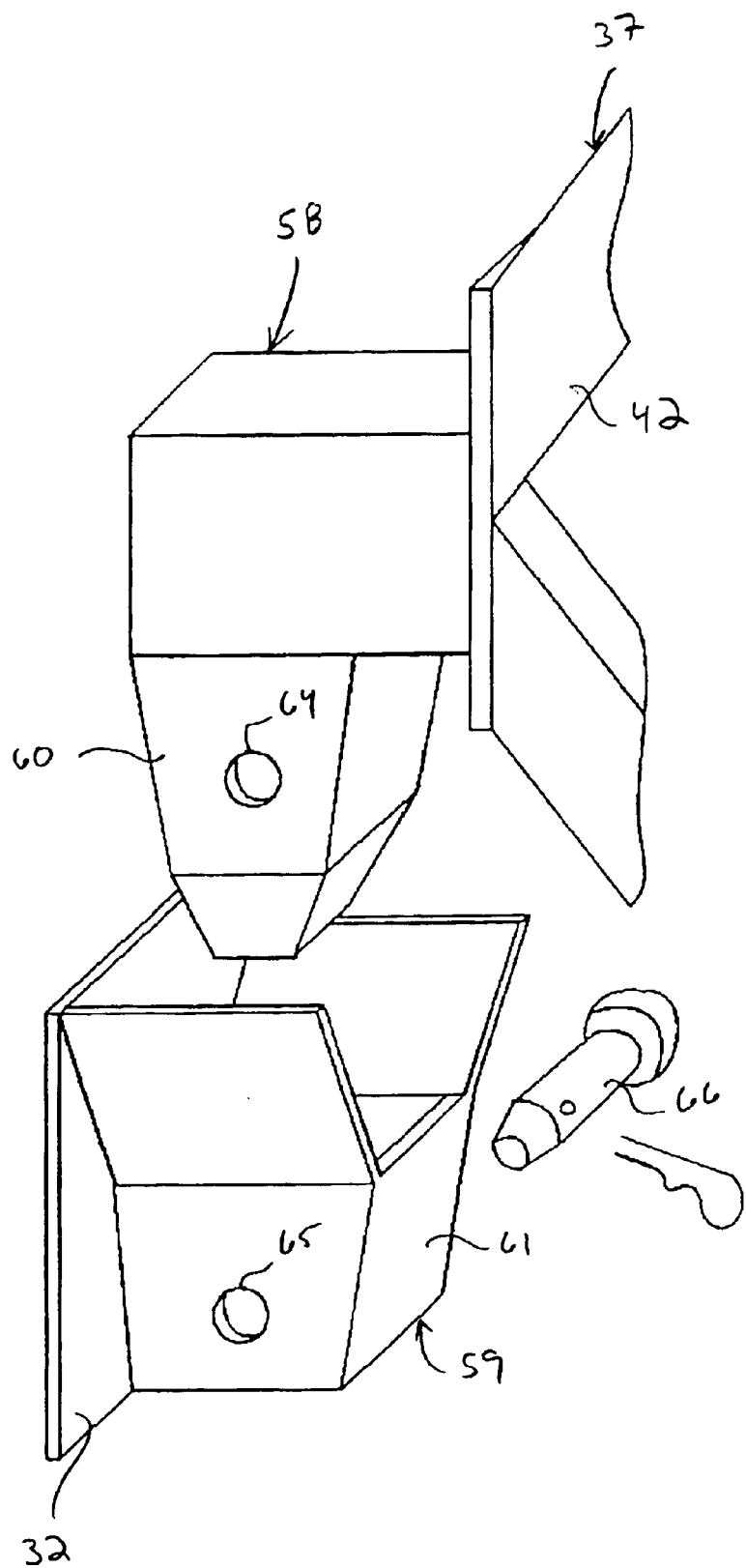
FIG. 5 is an enlarged perspective view of a quick-release bracket assembly of the collision attenuating system of FIG. 1.

Referring to FIG. 5, mounting brackets 59 may be permanently mounted on locomotive 32. Collision attenuating system 30 can be quickly attached to locomotive 32 by rolling the collision attenuating system into position in front of the locomotive, aligning the engagement brackets above the mounting brackets, and the actuating lifting mechanism to lower the collision attenuating system such that the engagement brackets slide into mounting brackets. The engagement and mounting brackets have a quick-release configuration such that collision attenuating system 30 can be quickly installed and removed from locomotive 32.

In the illustrated embodiment, engagement bracket 58 includes a tapered protrusion 60 that is received in a correspondingly shaped receptacle 61 of mounting bracket 59. Projection 60 and receptacle 61 include aligned engagement bores 64 and 65, respectively, through which a safety pin 66 is inserted to releasably secure engagement bracket 58 and mounting bracket 59, thus releasably securing collision attenuating system 30 to the front of locomotive 32. In the illustrated embodiment, the engagement pin is a tapered pin having a cotter pin to prevent the engagement pin from inadvertently sliding out of the engagement bores. One should appreciate that other fastening means including, but not limited to, wing nuts, spring pins, spring latches, and other well known means can be utilized in accordance with the present invention.

When collision attenuating system 30 is to be removed, the quick-release brackets are disengaged, that is, safety pin 66 is removed from engagement bores 64 and 65, then lifting mechanism 49 is actuated to first lower wheels 45 to the ground. Continued actuation of lifting mechanism 49 raises collision attenuating system 30 and engagement bracket 58 relative to locomotive 32 and mounting bracket 59 and thus lifts engagement bracket 58 out from mounting bracket 59. Once engagement brackets 58 are clear of mounting brackets 59, collision attenuating system 30 may be rolled away from locomotive 32 on wheels 43.

Turning now to the airbag assembly, in the event that locomotive 31 collides with a pedestrian in or crossing railway 33 in the path of the locomotive, the pedestrian will impact airbag assembly 36 and cause upper deflatable airbag 40 to deflate and absorb a substantial amount of the impact force. The shock-absorbing configuration of the airbag assembly allows the stricken pedestrian to accelerate to the speed of locomotive 32 and fall onto a pedestrian support 41 as deflatable airbag 40 collapses. As the stricken pedestrian is carried along by pedestrian support 41, the likelihood of the stricken pedestrian falling under the moving locomotive is decreased.

In one embodiment, deflatable airbag 40 is constructed of a flexible material such as, but not limited to, 22 oz vinyl coated polyester and/or other suitable fabrics. Preferably, deflatable airbag 40 is continuously inflated by an inflation fan 68, shown in FIG. 3, while locomotive 32 is traveling along railway 33. One should appreciate that the deflatable airbag may be configured to be selectively inflatable in accordance with the present invention. For example, an activation control switch may be provided in the locomotive operator's compartment such that the inflation fan is activated as determined necessary by the locomotive operator. Alternatively, the inflation fan may be configured such that it is actuated once the locomotive reaches a predetermined minimum speed. Alternatively, the deflatable airbag may be inflated by other suitable means. For example, an air supply in the form of the conventional compressed air supply available on a railway locomotive that is commonly used for pressurizing the brake system may be utilized to inflate the deflatable airbag.

Preferably, inflation fan 68 is a variable speed fan that pressurizes deflatable airbag 40 proportional to the speed of locomotive. In the illustrated embodiment, the speed of inflation fan 68 is controlled by a signal output by a locomotive speed sensor 69, which sensor is shown in FIG. 1. The signal from speed sensor 69 can be an analog voltage or a digitally encoded signal. As locomotive 31 accelerates, the speed signal increases in value and inflation fan 68 runs faster, thus increasing the air pressure within deflatable airbag 40. In low speed collisions, the air pressure is relatively low providing a lower resisting force, that is, a lower amount of energy absorption of the deflatable airbag that, in turn, will provide a less abrupt acceleration of the impacted pedestrian and a better chance of pedestrian capture. In higher speed collisions, the resisting force is higher allowing deflatable airbag 40 to absorb the higher levels of energy present in such higher speed collisions. The increased air pressure within deflatable airbag 40 at higher speeds also will keep the airbag shape from distorting under the higher air resistance encountered at higher locomotive speeds.

As shown in FIG. 3, deflatable airbag 40 is provided with a pressure regulator in the form of a relief valve, or as illustrated, in the form of three pressure relief doors 70 located on a rear surface of the deflatable airbag. Alternatively, the pressure relief doors may be located on the top and/or sides of the deflatable airbag. Pressure relief doors 70 may be formed of rigid or semi-rigid panels that are hinged and in fluid communication with the deflatable airbag. Alternatively, the pressure relief doors may be fabric panels. Although the illustrated embodiment includes three pressure relief doors, one should appreciate that one, two, three or more pressure relief doors may be utilized in accordance with the present invention.

Pressure relief doors 70 are secured closed by respective pressure relief latches 71. In one embodiment, latches 71 are not only sensitive to the pressure within deflatable airbag 40 but are also sensitive to the speed signal from speed sensor 69. In particular, a trigger threshold, that is, the minimum pressure at which latches 71 will allow doors 70 to open is a function of train speed. In low speed collisions, the trigger threshold is low allowing the deflatable airbag 40 to quickly collapse on impact. The low trigger threshold increases the probability that the pedestrian will be successfully captured by the energy-absorbing assembly and carried upon pedestrian support 41. At higher train speeds, the trigger threshold is higher thus reducing the possibility of accidental release of the air pressure in deflatable airbag 40, for example, in response to increased pressure within the deflatable airbag is response to the increased force of air resistance encountered at higher locomotive speeds.

In the embodiment illustrated in FIG. 2 and FIG. 3, pedestrian support 41 is constructed with a thick layer of foam encased in flexible material such as, but not limited to, 22 oz vinyl coated polyester and/or other suitable fabrics. Preferably, the foam layer of the pedestrian support is approximately six inches thick, however, one will appreciate that the actual dimensions of the pedestrian support may vary.

In other embodiments, the pedestrian support structure may include other suitable energy-absorbing means that has sufficient structural integrity to support a stricken pedestrian thereon. For example, pedestrian support may be constructed of an air filled rubber bladder and/or semi-rigid or even rigid structures. Examples of possible rigid or semi-rigid structures include, but are not limited to, corrugated cardboard, plastic, rubber, plastic plates, plywood structures, and frames with netting.

Figure 6:
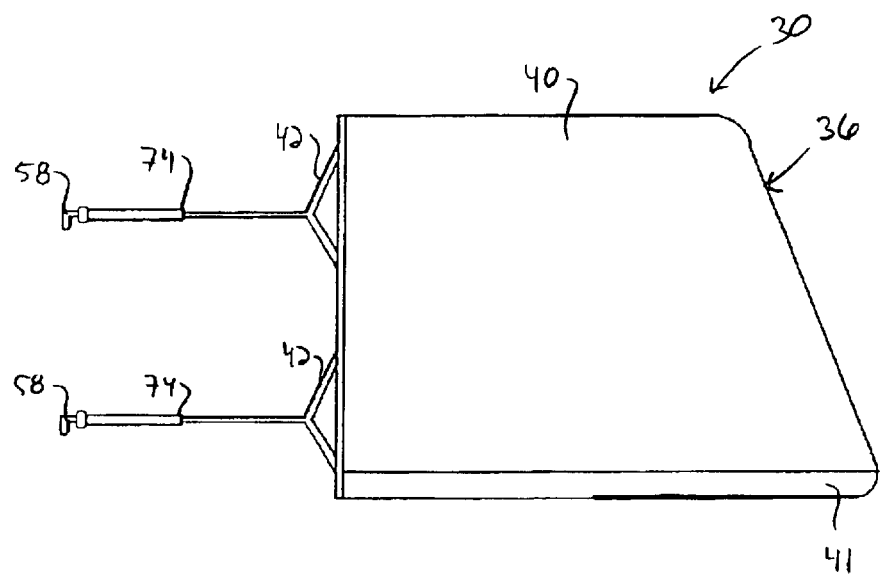
FIG. 6 is a side elevational view of the collision attenuating system of FIG. 1, shown equipped with a shock-absorbing unit mounted on the assembly frame.

In the event that collision attenuating system 30 collides with a moving vehicle, airbag assembly 36 will quickly collapse and might not significantly reduce the acceleration forces on the moving vehicle due to the substantially greater weight of the moving vehicle relative to a pedestrian. To further adapt collision attenuating system 30 for impacts with moving vehicles, airbag assembly frame 37 may be provided with mounting shock absorbers 74 interconnecting extension members 42 and engagement brackets 58, as shown in FIG. 6. In this case, shock absorbers 74 will compress and absorb the increased force of impact when locomotive 32 impacts a moving vehicle. Shock absorbers 74 are dimensioned and configured to absorb the greater impact energy due to a locomotive/moving vehicle collision. In the illustrated embodiment, shock absorbers 74 are either hydraulic or pneumatic cylinders. One will appreciate that other shock-absorbing means can be utilized in accordance with the present invention including, but not limited to, a crush structure, a collapsing structure utilizing interlocking channels with sheer pins, and/or other suitable means.

Figure 7:
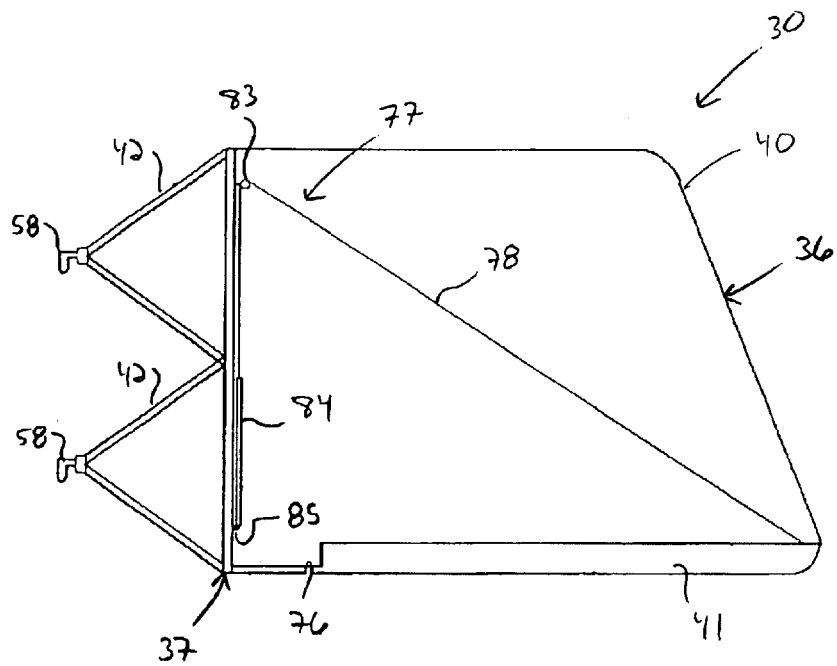
FIG. 7 is a cross-sectional side view of the collision attenuating system of FIG. 1 showing details of a lower pedestrian support.
Figure 8:
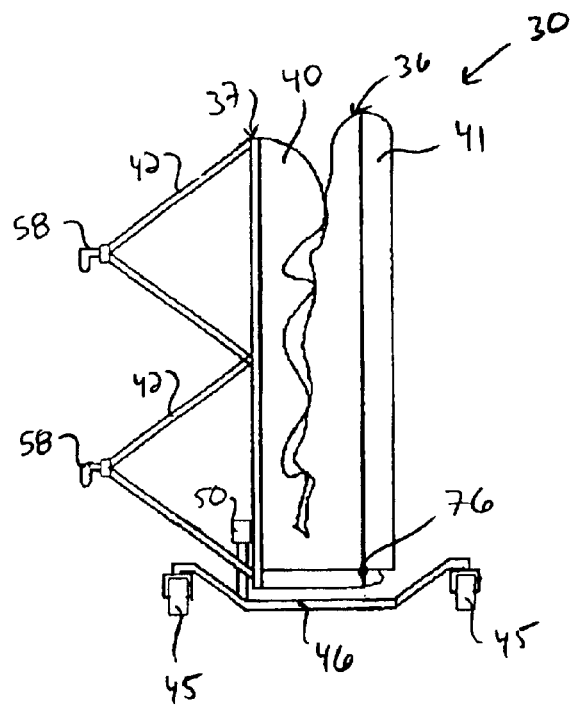
FIG. 8 is a side elevational view of the collision attenuating system of FIG. 1 shown in a folded storage mode.

Turning now to FIG. 7, pedestrian support 41 is pivotally connected to a lower portion of assembly frame 37 by a hinged connection 76. The hinged configuration allows a deflated collision attenuating system to be folded up for easier maneuvering on wheels 45, as shown in FIG. 8. This hinged configuration increases the operational ease of collision attenuating system 30 and of installing the system on locomotive 32 and/or other relatively large vehicles.

With continued reference to FIG. 7, the illustrated collision attenuating system 30 is provided with a retracting mechanism 77, however, one will appreciate that a retracting mechanism need not be used. In this embodiment, a plurality of retraction cords 78 are attached at one end to a forward portion of pedestrian support 41. Each retraction cord 78 extends through a ratcheting pulley 83. Any suitable ratcheting pulley means can be utilized in accordance with the present invention including, but not limited to the ROPE RATCHET® tie-down, manufactured by Carolina North Manufacturing, Inc. of Kernersville, N.C. The opposite end of each retraction cord 78 is attached to a spring mechanism 84 that, in turn, is secured to assembly frame 37 by an anchor connection 85. One will appreciate that any suitable spring means can be utilized including, but not limited to, a spring, an elastic cord and/or other suitable biasing means.

When ratcheting pulley 83 is in a first ratchet mode, the retraction cords may travel through the pulleys in one direction but not the other. For example, as pedestrian support 41 pivots counterclockwise about hinged connection 76, spring mechanism 84 draws retraction cord 78 through ratcheting pulley 83 in one direction. Ratcheting pulley 83 prevents pedestrian support from pivoting in a clockwise direction because ratcheting pulley 83 prevents withdrawal of retraction cord 78 in the opposite direction.

Figure 9:
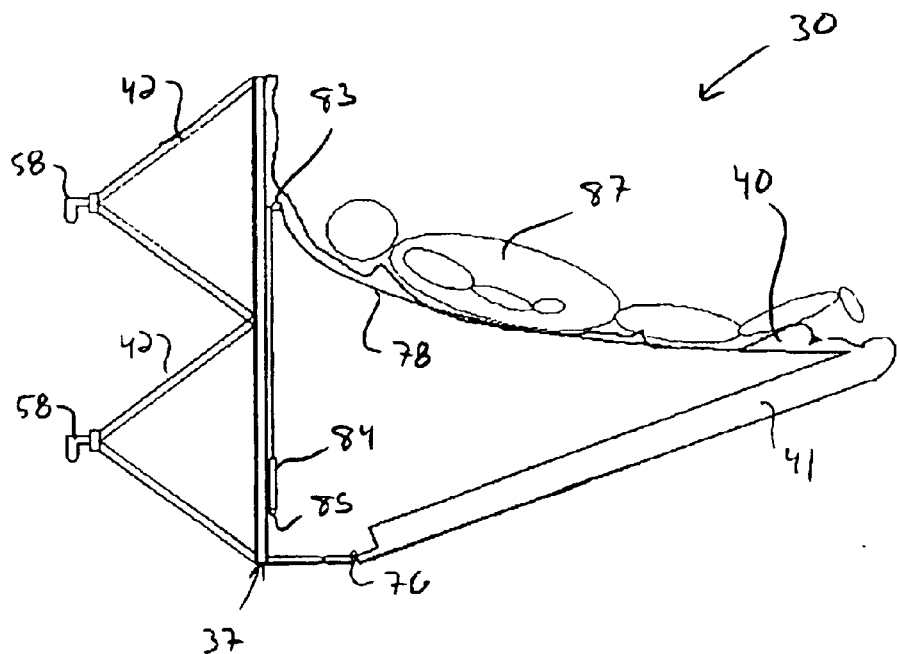
FIG. 9 is a cross-sectional side view of the collision attenuating system of FIG. 1 shown following an impact with a pedestrian.

FIG. 9 is a cutaway view of collision attenuating system 30 showing a stricken pedestrian 87 following impact. The force of impact causes the stricken pedestrian to deflect or otherwise bias retraction cord 78 as deflatable airbag 40 collapses. The deflection of retraction cord 78 pulls the forward end of pedestrian support 41 upward. Inertial and other forces, in turn, cause pedestrian support 41 to continue to rotate upward and counterclockwise about hinged connection 76 and create slack in retraction cord 78. Spring mechanism 84 pulls the slack from retraction cord 78 through ratcheting pulley 83. Meanwhile, ratcheting pulley 83 locks retraction cord 78 in place thus holding the forward end of pedestrian support 41 in a raised position, as shown in FIG. 9. The pivoting and locking configuration reduces the possibility that pedestrian 87 will slide or otherwise fall off pedestrian support 41 after impact collision and before the train reaches a complete stop.

Figure 10:
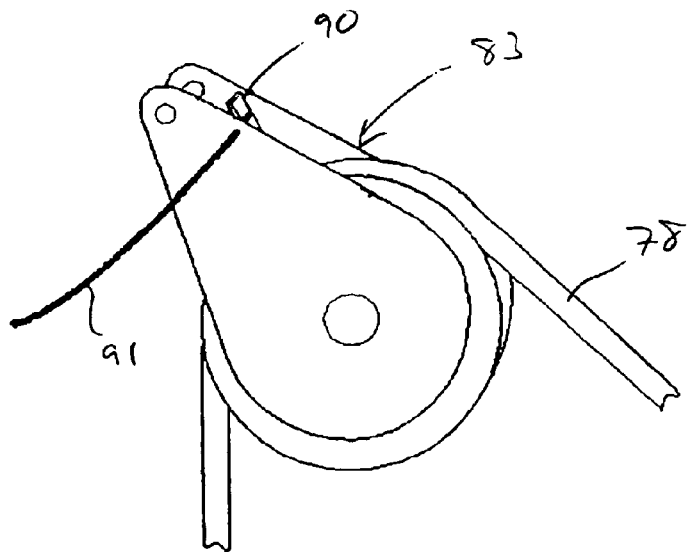
FIG. 10 is an enlarged detailed view of a locking retractor utilized by the collision attenuating system of FIG. 1.

In one embodiment shown in FIG. 10, ratcheting pulley 83 may include a ratchet control lever 90 having a deactivated position and an operational position. In the deactivated position, retraction cord 78 moves freely in either direction. In the operational position, retraction cord 78 may only move in a single direction. Ratchet control lever 90 is spring loaded, and when unloaded returns to the operational or ratchet mode in which retraction cord 78 may only move in a single direction. Ratchet control lever 90 is held in the deactivated position by an interlock wire 91. Interlock wire 91 may be interconnected with one or more of the pressure relief doors 70 or other suitable pressure relief valve.

During normal operation ratchet control lever 90 is in the deactivated or free position so that retraction cord 78 is free to move through retraction pulley 83 in either direction. Thus airbag assembly 36 can be easily and repeatedly folded up, as shown in FIG. 8, and down, as shown in FIG. 2. Upon impact, air pressure release door 70 opens and pulls interlock wire 91 away from retraction pulley 83 and thus releases ratchet control lever 90. The spring loaded ratchet control lever 90 will move to the activated position thus allowing retraction cord 78 to move through ratcheting pulley 83 in a counterclockwise direction, as illustrated in FIG. 9. Accordingly, when retraction mechanism 77 is activated, pedestrian support 41 may only pivot upwardly thus facilitating the capture of a stricken pedestrian.

Figure 11:
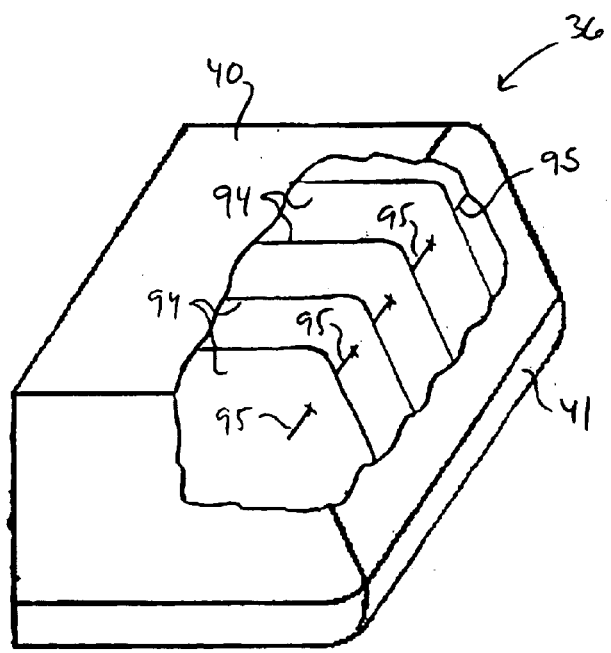
FIG. 11 is a partially fragmented perspective view of an airbag utilized by the collision attenuating system of FIG. 1.

Collision attenuating system 30 may include other features. For example, FIG. 11 schematically illustrates a plurality of internal baffles 94 within deflatable airbag 40. In the illustrated embodiment, four vertical baffles 94 are attached to the top, the front sloping surface, and the bottom. One will appreciate, however, that one or more vertical, horizontal, and/or diagonal baffles may be attached to the top, the sides, and/or the bottom of the deflatable airbag. The internal baffles maintain the preferred shape of the inflatable airbag. Preferably, the internal baffles are constructed from the same fabric as the exterior of the deflatable airbag including, but not limited to, 22 oz reinforced vinyl fabric. Alternatively, other fabrics, mesh netting, or even a set of cords may be used to maintain the inflated shape of the deflatable airbag. A plurality of horizontal cords 95 are also shown in FIG. 11 that may be provided to maintain the shape of the airbag. Each horizontal cord 95 connects one or more adjacent internal baffles 94 together and/or to the side of deflatable airbag 40. Horizontal cords 95 prevent the sides of the deflatable airbag from bellowing outward and/or protruding sideways. Preferably, horizontal cords 95 are attached to tabs having grommets, which tabs are sewn to the sides of deflatable airbag 40 and/or the side of internal baffles 94. One will appreciate, however, that the collision attenuating assembly of the present invention need not be provided with internal baffles and/or horizontal cords.

Figure 12:
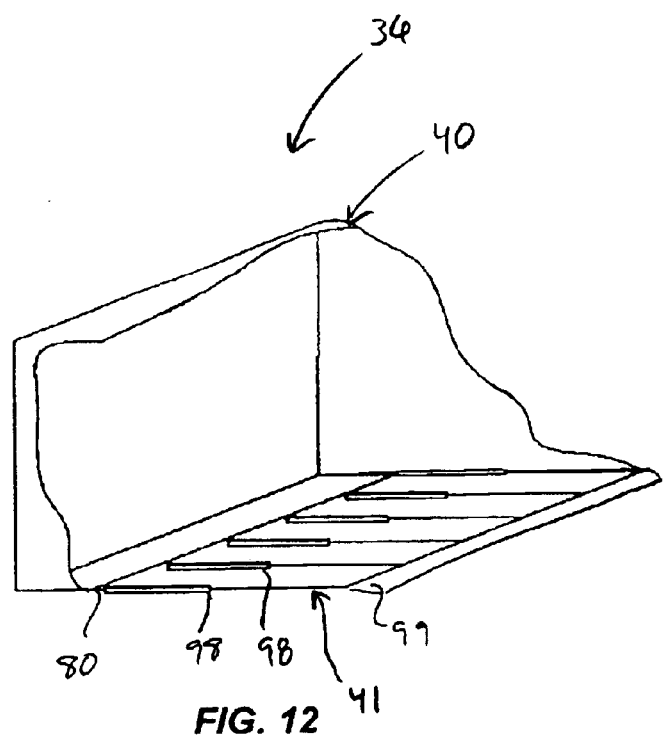
FIG. 12 is a partially fragmented perspective view of a modified collision attenuating system, similar to that shown in FIG. 1, showing details of a lower pedestrian support.

Turning now to FIG. 12, which illustrates another embodiment of airbag assembly 36, pedestrian support 41 may include one or more energy-absorbing units 98 interconnecting hinge 80 and a flexible leading edge 99. In the illustrated embodiment, the energy-absorbing units are provided in the form of shock absorbers, however, one will appreciate that other suitable energy-absorbing means may be used. Energy-absorbing units 98 can be hydraulic cylinders, pneumatic cylinders and/or other suitable energy-absorbing means including, but not limited to, crush structures and/or collapsing structures such as those utilizing interlocking channels with sheer pins. When airbag assembly 36 collides with a pedestrian, leading edge 99 contacts the lower extremities of the pedestrian. Shock absorbers 98 absorb some of the energy from the collision reducing the severity of the impact on the pedestrian. Although pedestrian support 41 partially collapses, it retains enough of its shape to support the pedestrian after impact.

Figure 13:
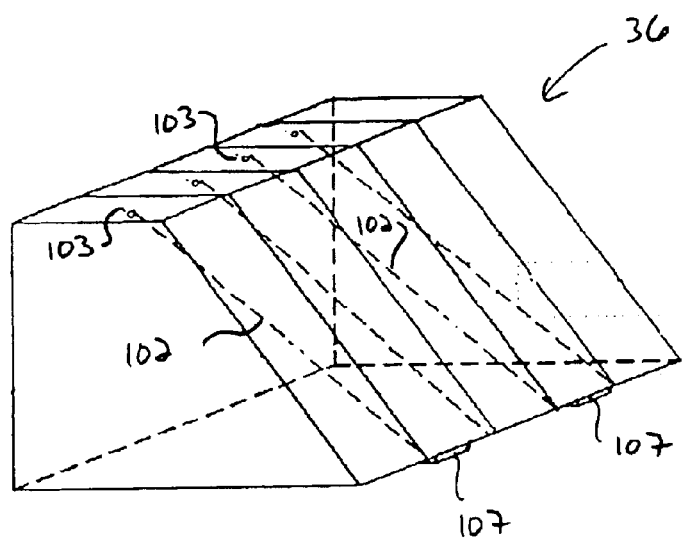
FIG. 13 is a schematic view of an airbag quick-lowering mechanism utilized by the collision attenuating system of FIG. 1.

FIG. 13 shows a further feature that may be utilized with the above-mentioned embodiments including, but not limited to, collision attenuating system 30. Airbag assembly 36 is provided with a one or more diagonal release cords 102. One end of release cord is attached to and supports the leading edge of airbag assembly 36 in the manner shown in FIG. 13. The opposite end, that is, the top rear end of each release cord 102 is attached to a release bracket 103. When the airbag is deployed under normal operation, the diagonal release cords hold the leading edge of the airbag up approximately 2-6 inches above railway 33. This reduces the probability that the airbag will be damaged by contact with the railway 33. When the operator of the train determines that there is a pedestrian in or about to cross the path of locomotive 30, the operator may activate a release switch 106 in the locomotive that activates the releasable catch such that release brackets 103 are freed thus allowing pedestrian support 41 to pivot downwardly until release cords 102 become taut thereby preventing pedestrian support 41 from dropping any further. Alternatively, one or more skid plates 107 may be provided to contact and slide along railway 33 thus positioning the pedestrian support. Preferably, skid plates 107 are made from strong material such as TEFLON®, plastic, metal, fiberglass, or wood. The lowered airbag increases the likelihood that the pedestrian will be captured by the airbag. This is especially useful when the pedestrian in a seated or prone position.

For convenience in explanation and accurate definition in the appended claims, the terms "up" or "upper", "down" or "lower", "inside" and "outside" are used to describe features of the present invention with reference to the positions of such features as displayed in the figures.

In many respects the modifications of the various figures resemble those of preceding modifications and the same reference numerals followed by subscript "a" designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A collision attenuating system for a moving vehicle, said collision attenuating system comprising:

an energy-absorbing assembly dimensioned and configured for attenuating the impact between the moving vehicle and a pedestrian or an impacted vehicle located in or crossing the path of the moving vehicle as the pedestrian or impacted vehicle impacts against said energy-absorbing assembly; and an assembly frame for securing said energy-absorbing assembly to the moving vehicle;

wherein said airbag assembly includes an upper deflatable airbag, and a lower pedestrian support, said pedestrian support including energy-absorbing structure and being dimensioned and configured to extend forwardly from the moving vehicle prior to impact.

2. A collision attenuating system according to claim 1, said collision attenuating system further comprising:
   a mounting bracket dimensioned and configured for being affixed to the moving vehicle;
   an engagement bracket affixed to said airbag assembly and engagable with said mounting bracket; and
   a quick-release fastener for removably engaging said engagement bracket to said mounting bracket for removably mounting said airbag assembly to the moving vehicle.

3. A collision attenuating system according to claim 1, wherein said collision attenuating system is mounted to a leading end of a leading railcar supported on a railway.

4. A collision attenuating system according to claim 1, wherein said airbag assembly comprises an assembly frame supporting said upper deflatable airbag, said engagement bracket being affixed to said assembly frame.

5. A collision attenuating system according to claim 4, wherein said collision attenuating system includes a plurality of mounting brackets, a plurality of engagement brackets affixed to said assembly frame, and a plurality of quick-release fasteners for releasably engaging respective ones of said mounting and engagement brackets.

6. A collision attenuating system according to claim 4, wherein said collision attenuating system further comprises a retractable wheel assembly mounted on said assembly frame for selectively raising said airbag assembly.

7. A collision attenuating system according to claim 6, wherein said collision attenuating system further comprises a lifting mechanism mounting said retractable wheel assembly to said assembly frame.

8. A collision attenuating system according to claim 4, wherein said collision attenuating system further comprises an energy-absorbing crush structure interconnecting said assembly frame and said engagement bracket.

9. A collision attenuating system according to claim 4, wherein said collision attenuating system further comprises a shock absorber interconnecting said assembly frame and said engagement bracket.

10. A collision attenuating system according to claim 1, wherein said collision attenuating system further comprises:
    a speed sensor for determining the speed of the vehicle; and
    a pressure regulator for controlling a pressure function of said airbag responsive to said speed sensor.

11. A collision attenuating system according to claim 10, wherein said pressure regulator is an air pressure release valve.

12. A collision attenuating system according to claim 1, wherein said upper deflatable airbag comprises said airbag including at least one internal baffle.

13. A collision attenuating system according to claim 1, wherein said pedestrian support comprises a hydraulic shock absorber or a pneumatic shock absorber.

14. A collision attenuating system according to claim 1, wherein said pedestrian support comprises an energy-absorbing crush structure.

15. A collision attenuating system according to claim 1, wherein said collision attenuating system further comprises a skid plate located below said pedestrian support.

16. A collision attenuating system according to claim 1, wherein said energy-absorbing structure is constructed of foam, an air bladder, or a combination thereof.

17. A collision attenuating system for a moving vehicle, said collision attenuating system comprising:
    an energy-absorbing airbag assembly dimensioned and configured for attenuating the impact between the moving vehicle and a pedestrian or an impacted vehicle located in or crossing the path of the moving vehicle as the pedestrian or impacted vehicle impacts against said airbag assembly, said airbag assembly including an airbag and an assembly frame supporting said airbag;
    a speed sensor for determining the speed of the vehicle; and
    a pressure regulator for controlling a pressure function of said airbag responsive to said speed sensor, said pressure regulator including an inflation fan for continuously inflating said airbag.

18. A collision attenuating system according to claim 17, wherein said pressure regulator further comprises an air pressure release valve.

19. A collision attenuating system according to claim 17, wherein said inflation fan is a variable speed inflation fan.

20. A collision attenuating system according to claim 17, wherein said collision attenuating system further comprises:
    a mounting bracket dimensioned and configured for being affixed to the moving vehicle;
    an engagement bracket affixed to said airbag assembly and engagable with said mounting bracket; and
    a quick-release fastener for removably engaging said engagement bracket to said mounting bracket for removably mounting said airbag assembly to the moving vehicle.

21. A collision attenuating system for a moving vehicle, said collision attenuating system comprising:
    an energy-absorbing assembly dimensioned and configured for attenuating the impact between the moving vehicle and a pedestrian or an impacted vehicle located in or crossing the path of the moving vehicle as the pedestrian or impacted vehicle impacts against said energy-absorbing assembly; and
    an assembly frame for securing said energy-absorbing assembly to the moving vehicle;
    wherein said airbag assembly includes an upper deflatable airbag, and a lower pedestrian support, said pedestrian support including energy-absorbing structure; and
    wherein said pedestrian support is flexibly supported by said assembly frame such that a leading edge of said pedestrian support moves upward upon at least partial deflation of said upper deflatable airbag due to impact with the pedestrian or impacted vehicle.

22. A collision attenuating system according to claim 21, wherein said collision attenuating system further comprises a hinge flexibly supporting said pedestrian support on said assembly frame.

23. A collision attenuating system according to claim 21, wherein said collision attenuating system further comprises a locking retractor configured to prevent downward motion of said leading edge of said pedestrian support.

24. A collision attenuating system according to claim 23, wherein said collision attenuating system further comprises a speed sensor for determining the speed of the vehicle, and a pressure regulator for controlling a pressure function of said airbag responsive to said speed sensor.

25. A collision attenuating system according to claim 24, wherein said collision attenuation system includes an air pressure release valve.

26. A collision attenuating system according to claim 25, wherein said collision attenuating system further comprises a retractor interlock, wherein said retractor interlock locks said locking retractor once the said release valve releases air from said upper deflatable airbag.

27. A collision attenuating system according to claim 21, wherein said collision attenuating system further comprises a release mechanism for lowering said pedestrian support portion.

28. A collision attenuating system according to claim 21, wherein said pedestrian support portion includes skid plates.

29. A collision attenuating system according to claim 27, wherein said collision attenuating system further comprises:

a mounting bracket dimensioned and configured for being affixed to the moving vehicle;

an engagement bracket affixed to said airbag assembly and engagable with said mounting bracket; and a quick-release fastener for removably engaging said engagement bracket to said mounting bracket for removably mounting said airbag assembly to the moving vehicle.

* * * * *